United States Patent [19]
Yamamoto et al.

[11] Patent Number: 5,563,486
[45] Date of Patent: Oct. 8, 1996

[54] PULSE MOTOR DRIVER

[75] Inventors: Tomohisa Yamamoto, Aichi-ken; Junji Hayakawa, Okazaki; Hiroyuki Ban; Tukasa Miyake, both of Aichi-ken; Masami Kataoka, Anjo, all of Japan

[73] Assignee: Nippondenso Co., Ltd., Kariya, Japan

[21] Appl. No.: 362,933

[22] Filed: Dec. 23, 1994

[30] Foreign Application Priority Data

Dec. 24, 1993 [JP] Japan .................................. 5-326474

[51] Int. Cl.⁶ .............................. H02P 8/14; G01C 22/00
[52] U.S. Cl. .............................................. 318/696; 318/701
[58] Field of Search ................................... 318/685, 696, 318/138, 139, 254, 439, 701

[56] References Cited

U.S. PATENT DOCUMENTS

| | | | |
|---|---|---|---|
| 3,560,819 | 2/1971 | Overa | 318/138 |
| 3,644,817 | 2/1972 | Rosen | 318/696 |
| 3,659,176 | 4/1972 | Marshall | 318/696 |
| 3,885,210 | 5/1975 | Burnett | 318/696 |
| 3,890,554 | 6/1975 | Yoshitake et al. | 318/696 |
| 3,909,693 | 9/1975 | Yoshitake et al. | 318/696 |
| 3,937,003 | 2/1976 | Busch et al. | 318/138 |
| 4,297,625 | 10/1981 | Newell | 318/696 |
| 4,300,085 | 11/1981 | Monma et al. | 318/696 |
| 4,490,663 | 12/1984 | Kamiyama et al. | 318/696 |
| 4,495,455 | 1/1985 | Araki | 318/696 |
| 4,697,129 | 9/1987 | Enami et al. | |

FOREIGN PATENT DOCUMENTS

| | | |
|---|---|---|
| 56-113500 | 2/1971 | Japan . |
| 60-15126 | 5/1985 | Japan . |
| 64-77497 | 3/1989 | Japan . |
| 2-80872 | 6/1990 | Japan . |
| 5-284789 | 10/1993 | Japan . |
| 6-18294 | 1/1994 | Japan . |
| 6-38592 | 2/1994 | Japan . |

*Primary Examiner*—Bentsu Ro
*Attorney, Agent, or Firm*—Cushman Darby & Cushman, L.L.P.

[57] ABSTRACT

A driving circuit of a pulse motor for use in a vehicle odometer is provided. The driving circuit includes a pulse source for providing drive pulses, in sequence, to a plurality of phase coils of the pulse motor, and a wave-shaper for shaping leading and trailing edges of each of the drive pulses so as to vary at a given rate in plural steps for noiseless smooth rotation of the pulse motor.

4 Claims, 6 Drawing Sheets

5,563,486

PULSE MOTOR DRIVER

BACKGROUND OF THE INVENTION

1. Technical Field of the Invention

The present invention relates generally to a pulse motor driver, and more particularly to an improvement on a pulse motor driver, for use in an odometer for automotive vehicles, designed for reducing mechanical noise which is produced in a gear train of the odometer and which would make vehicle occupants feel uncomfortable during traveling at relatively low speeds.

2. Background Art

Usually, pulse motors are used, as simple positioning motors which may be controlled by an open loop system, for mechanically operating some vehicular equipment. For example, Japanese Utility Model First Publication No. 2-80872 teaches a pulse motor employed in a vehicle odometer. This prior art pulse motor, however, has a drawback in that it rotates quickly in stepwise fashion upon input of exciting pulse signals, causing mechanical noise to be produced due to the backlash of a gear train or so forth. To overcome this problem, it has been proposed in the art that interphase capacitors are so arranged between phase coils of a pulse motor as to provide a delay serving to have an exciting current rise gradually for preventing the pulse motor from rotating suddenly.

Such an approach, however, encounters another drawback in that since a resistance of phase coils is usually small, it is necessary to increase the capacity of a capacitor for providing a sufficient delay. This will lead to a bulky circuit structure.

SUMMARY OF THE INVENTION

It is therefore a principal object of the present invention to avoid the disadvantages of the prior art.

It is another object of the present invention to provide a pulse motor driver circuit which is capable of reducing mechanical noise during a motor operation without the use of any interphase capacitors.

According to one aspect of the present invention, there is provided a driving apparatus for a pulse motor employed in a vehicle odometer which comprises a plurality of switching elements having resistors connected in parallel with each other, each of the switching elements being disposed on an exciting line communicating in series with a corresponding one of a plurality of phase coils of the pulse motor and a switching control means for controlling switching operations of the switching elements, the switching control means being responsive to input of excitation signals to the phase coils to energize the switching elements, in sequence, for establishing electrical communications to supply the excitation signals to the phase coils.

According to another aspect of the present invention, there is provided a driving apparatus for a pulse motor employed in a vehicle odometer which comprises a comparing means for comparing a voltage provided based on an input signal varying according to a vehicle speed, the comparing means providing a first signal when the voltage is greater than a given voltage level and a second signal when the voltage is smaller than the given voltage level, a first driving means, responsive to the second signal provided from the comparing means, to drive the pulse motor at a preselected lower rate, and a second driving means, responsive to the first signal provided from the comparing means, to drive the pulse motor at a preselected higher rate.

According to a further aspect of the invention, there is provided a driving apparatus for a pulse motor employed in a vehicle odometer which comprises a plurality of switching elements, having resistors, each disposed on an exciting line communicating in series with a corresponding one of a plurality of phase coils of the pulse motor, a switching control means for controlling switching operations of the switching elements, the switching control means being responsive to input of excitation signals provided based on a given input signal to the phase coils to energize the switching elements, in sequence, for establishing electrical communications to supply the excitation signals to the phase coils, a canceling signal output means for outputting a canceling signal to cancel a sequential communication operation of the switching control means when a voltage provided by the given input signal exceeds a preselected voltage level, and a switching means, responsive to the canceling signal from the canceling signal output means, for canceling the sequential communication operation of the switching control means to input a given excitation signal to at least one of the phase coils of the pulse motor.

According to a still further aspect of the present invention, there is provided a driving apparatus for a pulse motor employed in a vehicle odometer which comprises a plurality of transistors connected in parallel with each other, the transistors having given resistances each leading to a corresponding one of a plurality of phase coils of the pulse motor, a plurality of flip-flops connected in series with each other, the flip-flops communicating through a logic circuit with the transistors, respectively, for energize the transistors in sequence according to a variation in an input signal, a frequency-voltage converter circuit provided prior to the flip-flops to convert the input signal into a voltage signal, a comparator provided prior to the flip-flops to compare the voltage signal from the frequency-voltage converter circuit with a preselected threshold voltage to output a canceling signal to the logic circuit when the voltage signal exceeds the preselected threshold voltage for canceling sequential communication operations of the transistors while energizing at least one of the transistors to establish the electrical communication thereof.

According to a yet further aspect of the invention, there is provided a driving apparatus for a pulse motor which comprises a pulse source means for providing drive pulses, in sequence, to a plurality of phase coils of the pulse motor and a wave-shaping means for shaping the drive pulses provided from the pulse source means to the phase coils of the pulse motor, the wave-shaping means modifying leading and trailing edges of each of the drive pulses so as to vary at a given rate in plural steps.

In the preferred mode of the invention, the wave-shaping means includes switching circuits one for each phase coil, each of the switching circuits switches between first and second switching modes according to a given input signal. The first switching mode is established to vary the leading and trailing edges of each of the drive pulses in the plural steps when the given input signal is greater than a preselected value and it is required to rotate the pulse motor at a lower speed, while the second switching mode is established to vary the leading and trailing edges of each of the drive pulses in one step when the given input signal is smaller than the preselected value and it is required to rotate the pulse motor at a higher speed.

The wave-shaping means is operable to select between first and second wave-shaping modes. The first wave-shaping mode is to set first portions of the leading and trailing edges of each of the drive pulses to a first level. The second wave-shaping mode is to set second portions continuing from the first portions of the leading and trailing edges of each of the drive pulses to a second level higher than the first level.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
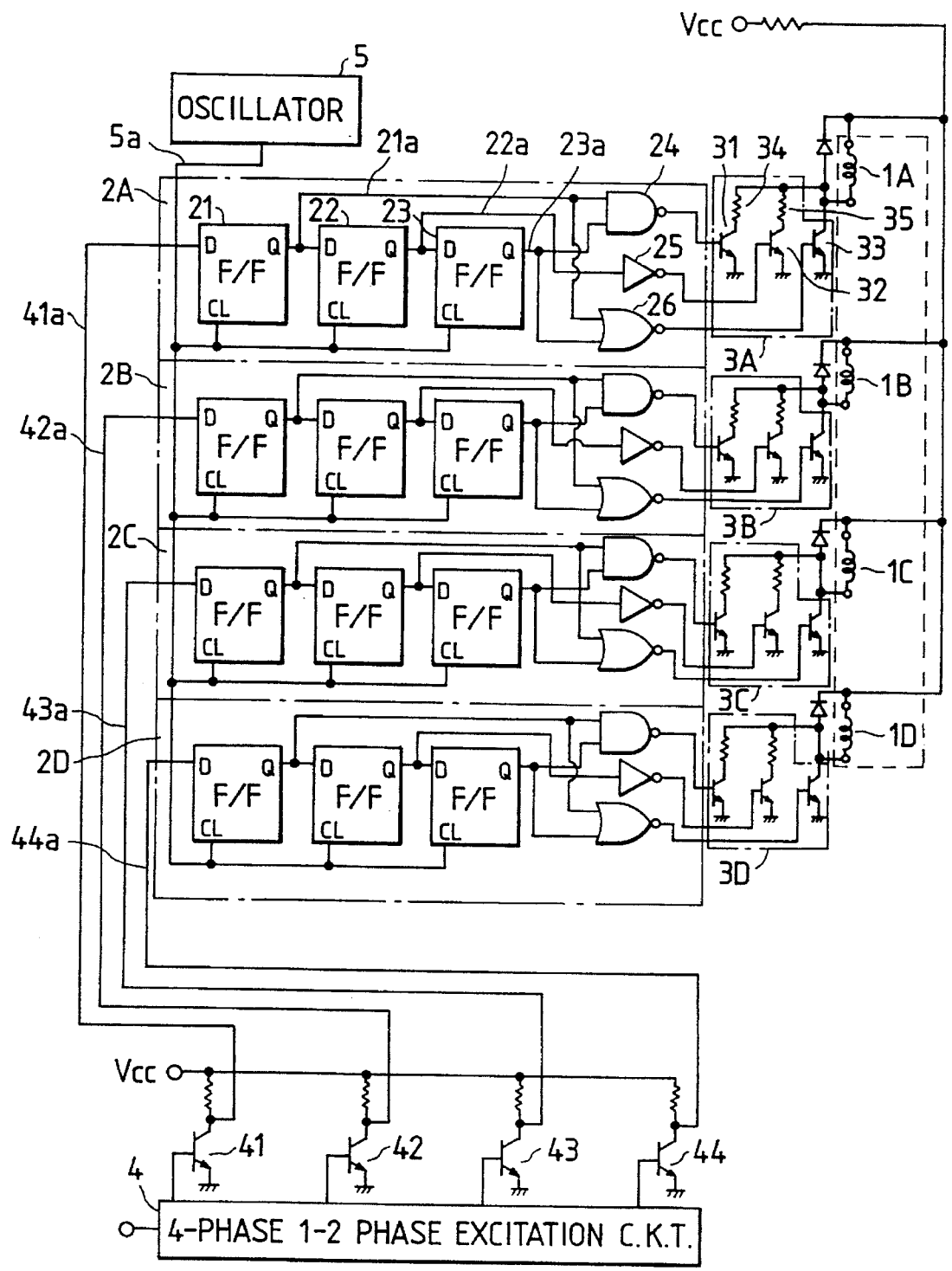
FIG. 1 is a circuit diagram which shows a pulse motor driver according to the present invention.

Referring now to the drawings, wherein like numbers refer to like parts in several views, particularly to FIG. 1, there is shown a pulse motor driver according to the present invention.

The pulse motor driver generally includes switching circuits 3A, 3B, 3C, and 3D and switching control circuits 2A, 2B, 2C, and 2D. The switching circuits 3A to 3D are identical in circuit structure and respectively include two resistors 34 and 35 and three transistors 31, 32, and 33 arranged in parallel. The switching control circuits 2A to 2D are also identical in circuit structure and include three flip-flops 21, 22, and 23 arranged in series, a NAND gate 24, an inverter 25, and a NOR gate 26, respectively.

A pulse motor is composed of four phase coils 1A, 1B, 1C, and 1D which connect at their ends with a common power source Vcc and also connect through their other ends with the switching circuits 3A, 3B, 3C, and 3D.

The switching circuits 3A to 3D are activated by the switching control circuits 2A, 2B, 2C, and 2D, respectively. Each of the NAND gates 24 takes in output signals 21a and 23a from the flip-flops 21 and 23, and puts out an output signal to a base of the transistor 31. In addition, each of the NOR gates 26 takes in the output signals 21a and 23a from the flip-flops 21 and 23, and provides an output signal to a base of the transistor 33.

To a CL terminal of each of the flip-flops 21 to 23 of the switching control circuits 2A to 2D, a clock pulse 5a is inputted from an oscillator 5. The flip-flops 21 to 23 are each responsive to the clock pulse 5a to provide through their Q terminals output signals in synchronism with falling of the clock pulse 5a.

To D terminals of the first flip-flops 21 of the switching control circuits 2A to 2D, excitation signals 41a, 42a, 43a, and 44a of low (L) level are applied from the transistors 41, 42, 43, and 44. These excitation signals 41a to 44a are provided to excite the phase coils 1A to 1D of the pulse motor according to outputs of a four-phase 1–2 phase excitation circuit 4 which is conventional. The four-phase 1–2 phase excitation circuit 4 may alternatively be provided with another type of excitation circuit such as a four-phase two-phase excitation circuit or two-phase two-phase excitation circuit.

Figure 2:
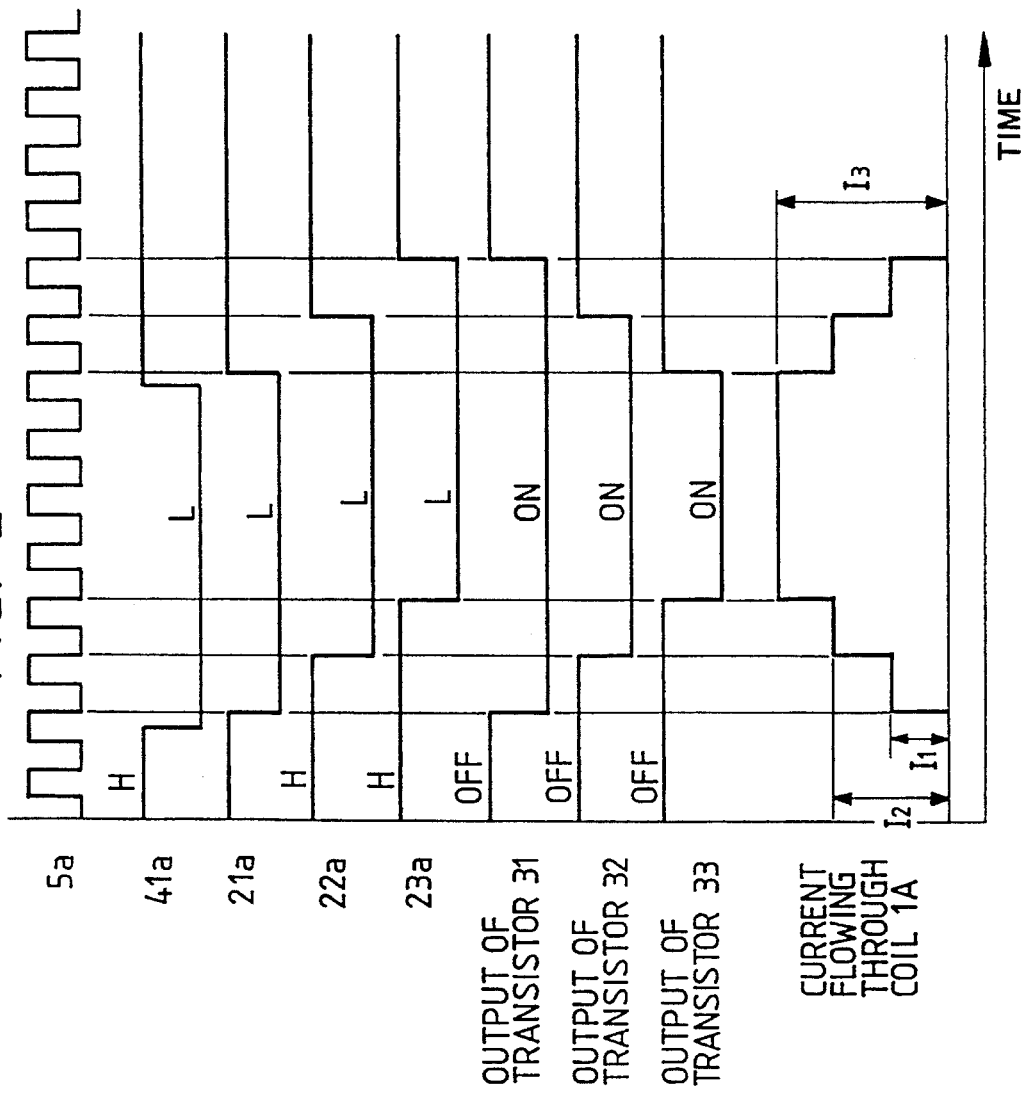
FIG. 2 is a time chart which shows an operation of the pulse motor driver shown in FIG. 1.

With reference to a time chart in FIG. 2, an operation of the pulse motor driver for energizing the phase coil 1A will be discussed below. The other phase coils 1B to 1D are sequentially excited in the same way as the phase coil 1A, and explanation thereof in detail will be omitted here.

When the excitation signal 41a provided from the excitation circuit 4 is switched from a high (H) level to a low (L) level, it will cause the flip-flops 21 to 23 of the switching control circuit 2A to provide output signals, in sequence, which show the L level, upon falling of the clock pulse 5a outputted from the oscillator 5. As seen in the time chart, in response to the initial falling of the clock pulse 5a, the transistor 31 to which the output of the NAND gate 24 is inputted, conducts to allow an excitation current I1 determined by a resistance value of the resistor 34 and a resistance value of the phase coil 1A, to flow through the phase coil 1A.

The transistor 32, to which the output from the inverter 25 is inputted, is responsive to the subsequent falling of the clock pulse 5a to establish electrical communication which allows a middle excitation current I2, determined by a parallel resistance value of the resistors 34 and 35 and the resistance value of the phase coil 1A, to flow through the phase coil 1A. The transistor 33, to which the output from the NOR gate 26 is inputted, is responsive to the third falling of the clock pulse 5a to conduct, thereby causing a higher excitation current I3 to be applied directly to the phase coil 1A without passage through the resistors 34 and 35.

With the above arrangements, the excitation current supplied to the phase coil 1A is stepwise increased at a given rate to a maximum level, thereby allowing the pulse motor to rotate smoothly.

Similarly, upon the excitation signal 41a being changed to the H level, non-conduction is established in sequence from the transistor 33 to the transistor 31 so that the excitation current supplied to the phase coil 1A is decreased to zero in stepwise fashion. This also prevents the pulse motor from rotating suddenly.

A stepwise variation in the excitation current supplied to the phase coils 1A to 1D is finely adjusted by increasing the transistors of the transistor circuits 3A to 3D and the flip-flops of the switching control circuits 2A to 2D and regulating output cycles of the clock pulse 5a properly.

As apparent from the above discussion, the pulse motor driver of this embodiment provides drive current pulses having a waveform whose leading and trailing edges are varied at a given rate in plural steps for reducing mechanical noise of a gear train of the pulse motor during a motor operation. Now, with development of semiconductor techniques, there is an increasing need for small equipment. The inventors of this application, therefore, have tried to reduce the size of the pulse motor driver as well as to prevent mechanical noise of the pulse motor from being produced. Hereinafter, a reduced size pulse motor driver according to the invention will be discussed.

Figure 3:
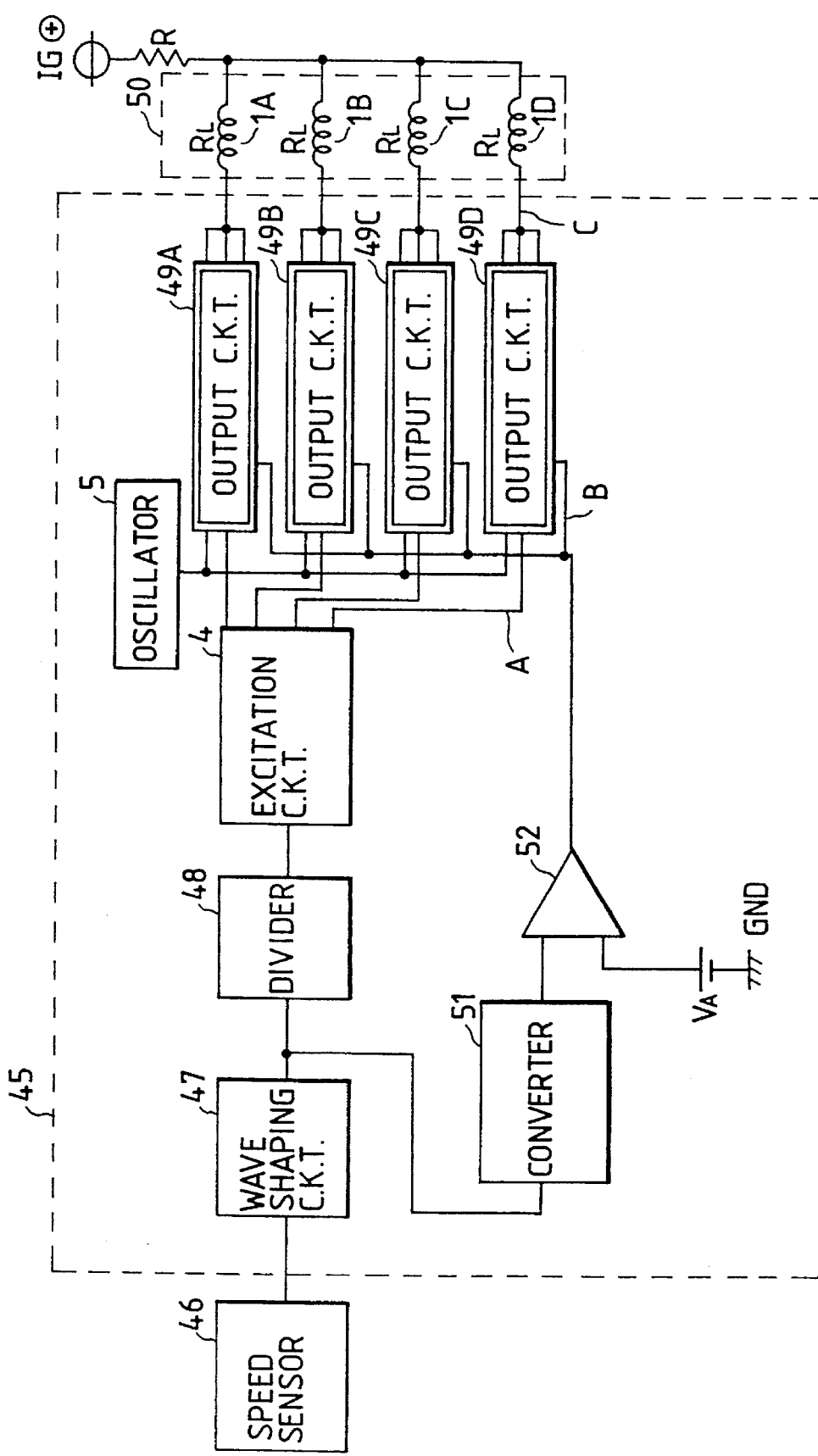
FIG. 3 is a circuit diagram which shows an alternative embodiment of a pulse motor driver.

FIG. 3 shows a pulse motor driver, according to an alternative embodiment, which is designed for driving a pulse motor-operated odometer 50 for an automotive vehicle. The same reference numbers as shown in FIG. 1 refer to the same parts and explanation thereof in detail will be omitted here.

The pulse motor driver is provided with an IC 45 which includes a wave-shaping circuit 47, a divider 48, a frequency-voltage converter circuit 51, a four-phase 1–2 phase excitation circuit 4, a comparator 52, three-step current output circuits 49A, 49B, 49C, and 49D, and an oscillator 5.

The wave-shaping circuit 47 takes in an output signal, indicative of a vehicle speed monitored by a speed sensor 46, which would contain much noise, and translates it into a square wave signal. The divider 48 then delivers an output frequency which is a fixed fraction of the input frequency to the three-step current output circuits 49A to 49D through the 4-phase 1–2 phase excitation circuit 4. The three-step current output circuits 49A to 49D provide excitation currents having a waveform, as referred to in the first embodiment in FIG. 2, to phase coils 1A to 1D of a pulse motor 50 in sequence according to outputs from the 4-phase excitation circuit 4 and the oscillator 5.

The frequency of the square wave signal which is shaped by the wave-shaping circuit 47, is converted by the frequency-voltage converter circuit 51 into a voltage signal which is, in turn, outputted to the comparator 52 which works as a cancel signal output means for canceling the outputs of the three-step current output circuits 49A to 49D. The comparator 52 is connected at its end to ground and receives a preselected threshold voltage $V_A$. When the voltage outputted from the frequency-voltage converter circuit 51 is changed in proportional to the vehicle speed and reaches the threshold voltage $V_A$, the comparator 52 provides a cancel signal through a line B to the three-step current output circuits 49A to 49D. The three-step current output circuits 49A to 49D are responsive to the cancel signal to switch a three-step output signal to a one-step output signal, as will be described later in detail.

Figure 4:
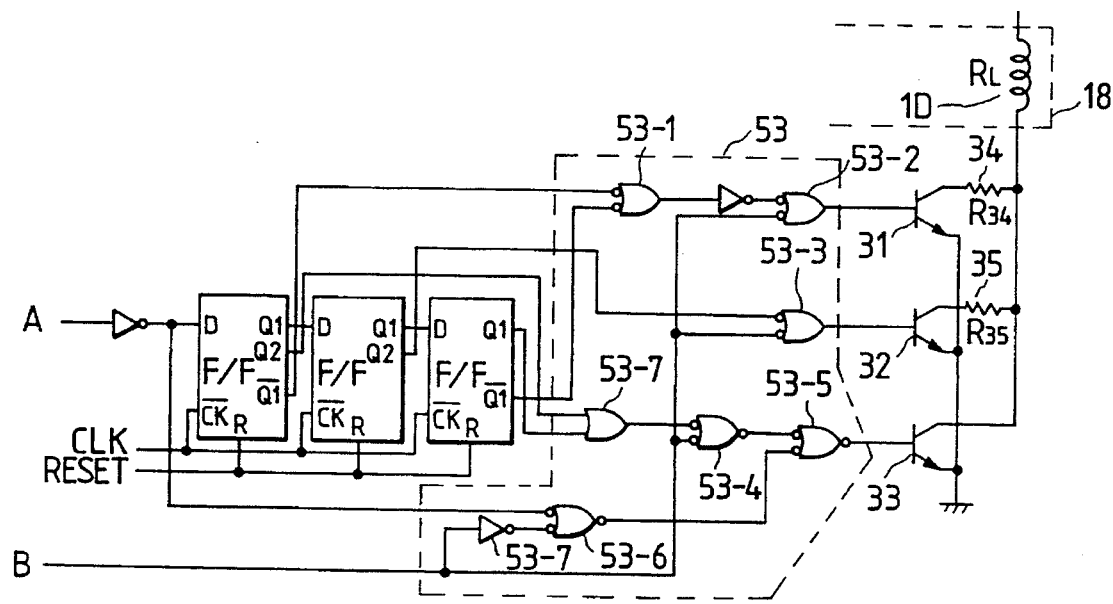
FIG. 4 is a circuit diagram which shows one of three-step current output circuits of the pulse motor driver shown in FIG. 3.

Referring to FIG. 4, the three-step current output circuit 49D is shown. The other three-step current output circuits 49A to 49C are identical in circuit construction and operation, and explanation thereof will be omitted here for the sake of brevity.

The three-step current output circuit 49D includes three flip-flops 60a, 60b, and 60c, a logic circuit 53, and three transistors 31, 32, and 33.

Figure 5:
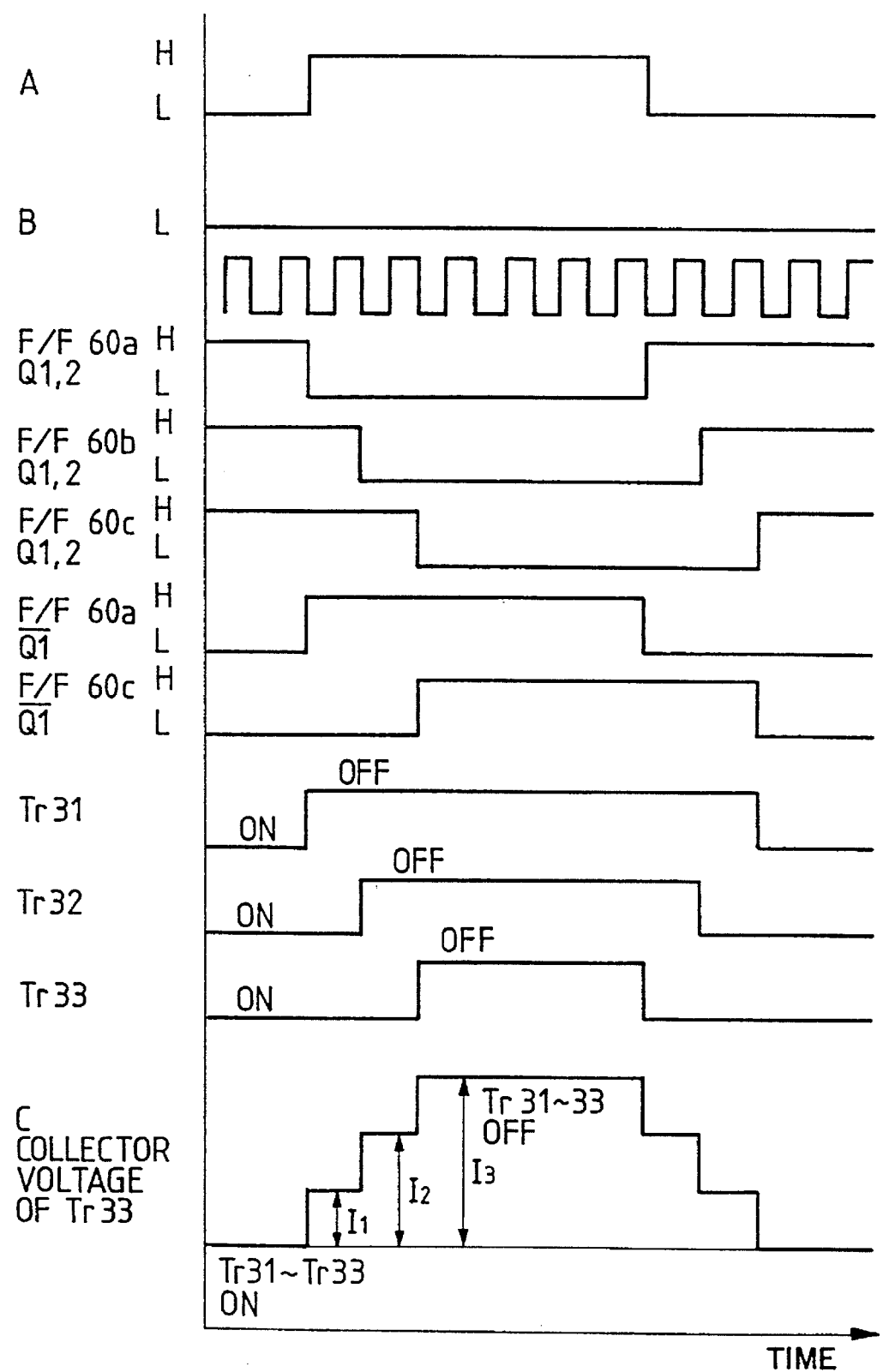

In operation, when an input signal to the flip-flop 60a through the line A is, as shown in FIG. 5, changed from low to high level, the flip-flops 60a to 60b, as long as an input signal appearing on the line B shows low level, provide output signals at low level through terminals Q1 and Q2, in sequence, in response to falling of a clock pulse (CLK) from the oscillator 5. The flip-flops 60a and 60c also provide output signal of high level through terminals $\overline{Q1}$, respectively. When the output signals from the terminal $\overline{Q1}$ of the flip-flops 60a and 60c both assume high level, a NOR gate 53-1 provides an output signal of low level to a NOR gate 53-2. The NOR gate 53-2 receives a signal of high level through the line B which is reversed in level by a NOT gate, and thus, provides the input from the OR gate 53-1 as its output. Therefore, the transistor 31 is turned off only when either of the outputs from $\overline{Q1}$s of the flip-flops 60a and 60c is high, thereby allowing a lower drive current I1 to flow through the phase coil 1D. Similarly, a NOR gate 53-3 receives through a terminal connected to the line B the signal of high level to provide the input from Q2 of the flip-flop 60b as its output. The transistor 32 is, thus, turned off when the output from Q2 of the flip-flop 60b represents the low level so that a middle drive current I2 is applied to the phase coil 1D. A NOR gate 53-4 provides an output signal which is reverse in level to the output from a NOR gate 53-7 since the high level signal is inputted thereto through the line B. In addition, a NOR gate 53-6 receives a signal of low level from a NOT gate 53-8, and thus, remains providing an output signal of high level. A NOR gate 53-5, therefore, provides an output signal which is reverse in level to the output from the NOR gate 53-4 so that the transistor 33 is turned off when both the outputs from Q2 of the flip-flop 60a and Q1 of the flip-flop 60c are at the low level, thereby allowing a higher drive current I3 to flow through the phase coil 1D.

Figure 6:
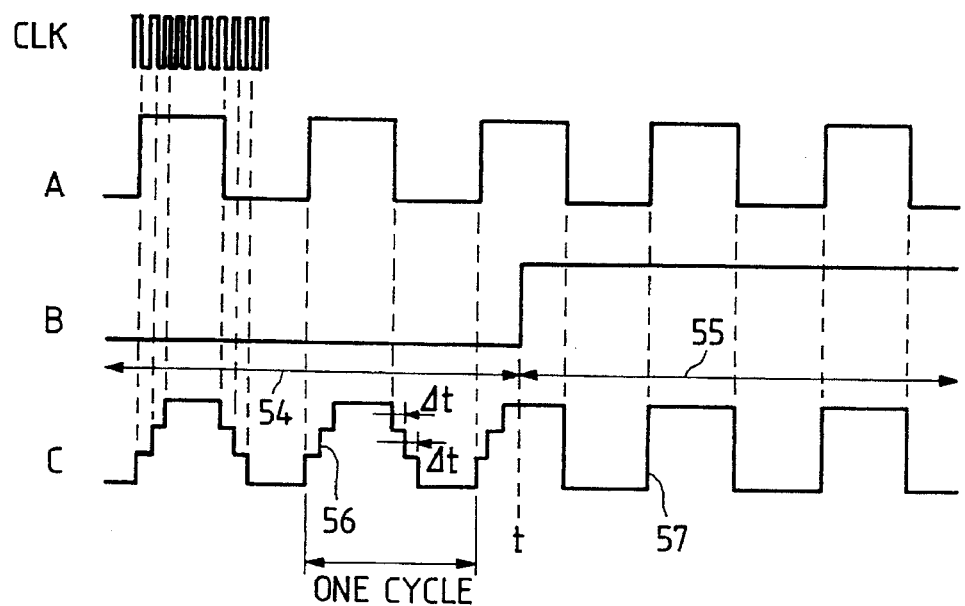
FIGS. 5 and 6 are time charts which show an operation of the pulse motor driver shown in FIG. 3.

When the vehicle speed increases, it will cause an output voltage converted by the frequency-voltage converter circuit 51 to increase proportionally. When it exceeds, as shown in FIG. 6, the threshold voltage $V_A$ at a time t, the comparator 52 provides a signal of high level (i.e., the three-step cancel signal) to the three-step current output circuit 49A (49B, 49C, 49D) through the line B.

When the signal appearing on the line B is switched to the high level, the outputs from the NOR gates 53-2 and 53-3 are fixed at the low level so that the transistors 31 and 33 are turned off to provide high level outputs. Additionally, the output from the NOR gate 53-4 is fixed at the high level so that the NOR gate 53-5 provides an output which is reverse in level to the output from the NOR gate 53-6. Since the NOR gate 53-6 receives the high level-fixed signal through the line B, it provides a signal having a level inputted through the line A as is. Therefore, the transistor 33 is actuated in phase with the signal inputted through the line A so that a drive current pulse is applied to the phase coil 1D without being changed in three steps.

In general, when the vehicle speed becomes high, mechanical noise such as engine noise prevails over the pulse motor noise. Thus, in a higher speed range, there is no problem if the drive current pulse applied to the pulse motor is so changed as to have a waveform which rises and falls in one step in phase with the input signal on the line A. In addition, the formation of the one-step drive current pulse consumes less power than that of the three-step drive current pulse since only one transistor is used for providing the one-step drive current pulse. Accordingly, according to the above mentioned second embodiment, when the vehicle speed lies in a lower speed range where the pulse motor noise would make vehicle occupants feel uncomfortable, the drive current pulse applied to the pulse motor is changed at a predetermined rate in three steps during the rising and falling thereof for noiseless smooth rotation. When the vehicle speed falls in a higher speed range, the driving current pulse which rises and falls in one step, is applied to the pulse motor for reduction in power consumption. This results in decreased allowable power consumption in the circuit, permitting the whole circuit structure to be reduced in size.

Figure 7:
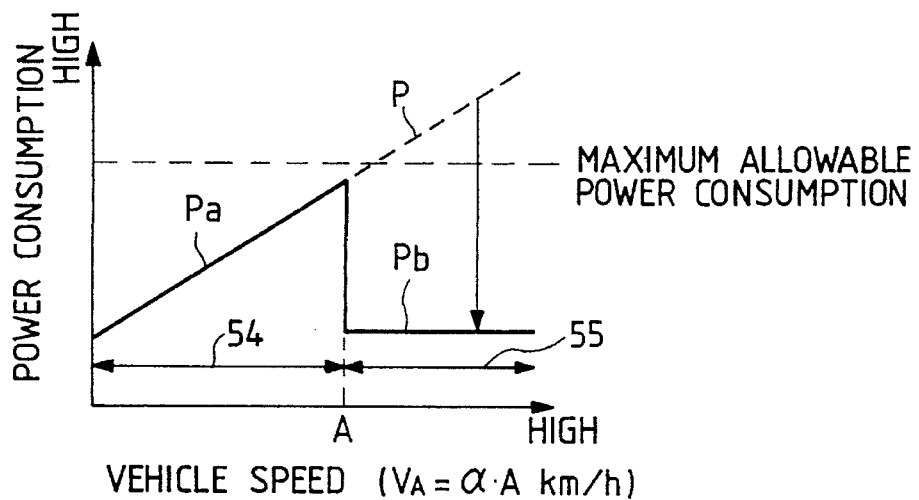
FIG. 7 is a graph which shows the relation between a power consumption of the pulse motor driver shown in FIG. 3 and a vehicle speed.

FIG. 7 illustrates the relation between power consumption P of the IC 45 in the vehicle odometer and vehicle speed.

The graph shows that when the vehicle speed is less than Akm/h, the power consumption Pa in the three-step mode increases, as expressed by the equation 1 below, in proportional to an increase in vehicle speed, while when it reaches Akm/h, an input voltage to the comparator 52 exceeds the threshold value $V_A$ so that the drive current pulse supplied to the pulse motor is changed to the one-step mode from the three-step mode. The power consumption Pa is, thus, reduced to a constant value Pb, according to the equation 2 below, regardless of the vehicle speed.

$$Pa = D \cdot V_{CESAT} \cdot I + f \cdot \Delta P \quad (1)$$

where D denotes an ON-OFF ratio of a transistor, $V_{CESAT}$ represents a collector-to-emitter voltage of a transistor, I is the current flowing through a transistor, $\Delta P$ indicates the power consumed in one cycle, as shown in FIG. 6, and f indicates a pulse frequency or the number of cycles per second.

$$Pb = D \cdot V_{CESAT} \cdot I \quad (2)$$

In general, the guaranteed maximum temperature Ta of an IC employed in a vehicle odometer is 105° C. and the guaranteed maximum operating temperature Tj of a silicon semiconductor (hereinafter, referred to as a chip) is 150° C. The chip is, therefore, allowed to radiate a heat of 45° C. (=Tj–Ta=150° C.–105° C.).

When a 0.3"-width shrink 24-pin resin mould package is utilized as the most suitable one for the IC 45 of the circuit shown in FIGS. 3 and 4 from economical and package size standpoints, since its thermal resistance shows 50° C./W, a maximum power consumption $P_{MAX}$ of the chip will be 45° C.÷50° C./W=900 mW.

Therefore, assuming that the guaranteed temperature Ta=105° C., the power supply IG=16 V, a resistance $R_{34}$=775 Ω, a resistance $R_{35}$=178 Ω, a reactance $R_L$=264 Ω, an odometer guaranteed resistance R=30 Ω, $V_{CESTAa}$ of the transistors 31 and 32=0.9 V, $V_{CESTAb}$ of the transistor 33–1.1 V, the ON-OFF ratio D=15/40, a step time Δt=4.5 ms, a pulse frequency $f_{100}$ at a vehicle speed of 100 km/s=22/sec., and a pulse frequency $f_{180}$ at a vehicle speed of 180 km/s=40/sec, from the above equations (1) and (2), a power consumption $Pa_{100}$ in the three-step mode at a vehicle speed of 100 km/s, a power consumption $Pa_{180}$ in the three-step mode at a vehicle speed of 180 km/s, and a time-independent power consumption Pb in the one-step mode are $$Pa_{100} = 230 \ mW$$

$$Pa_{180} = 349 \ mW$$

$$Pb = 83.6 \ mW$$

Taking a measurement of a total power consumption of other components in the circuit shown in FIG. 3, it has been found to be 650 W. Thus, when 650 W is added to the above values, $Pa_{100}$ is 880 mW and Pb=733.6 mW, while $Pa_{180}$ is 999 mW which is higher than the maximum power consumption $P_{MAX}$ of the chip (=900 mW). When the power consumption exceeds 900 mW, it will cause the chip to produce a heat of more than 150° C. of the guaranteed operating temperature Tj, leading to a malfunction of the circuit. It will be thus appreciated that by changing the drive current pulse supplied to the pulse motor from the three-step mode to the one-step mode when the vehicle speed exceeds 100 Km/s, the power consumption is restricted below 900 mW over a speed range from 0 to 180 km/h.

Figure 8:
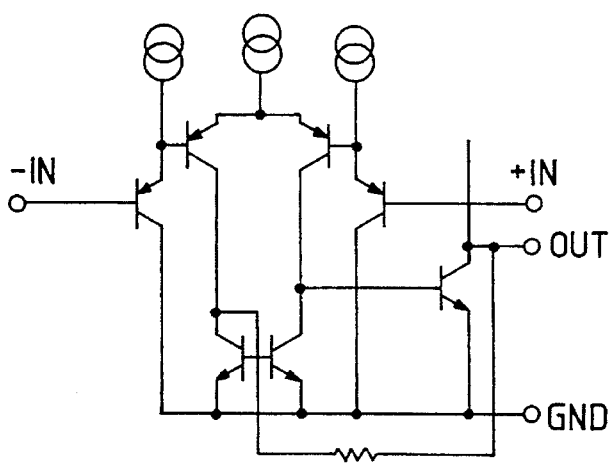
FIG. 8 is a circuit diagram which shows a modification of a comparator employed in the pulse motor driver shown in FIG. 3.

The frequency-voltage converter circuit 51, as shown in FIG. 3, usually produces ripple. It is, thus, desirable that the comparator 52 receiving an signal from the converter circuit 51 have given hysteresis. For example, a circuit structure shown in FIG. 8 may be used with the comparator 52. In the shown circuit, the hysteresis is developed by a resistor between an output terminal (OUT) and an npn transistor.

Figure 9:
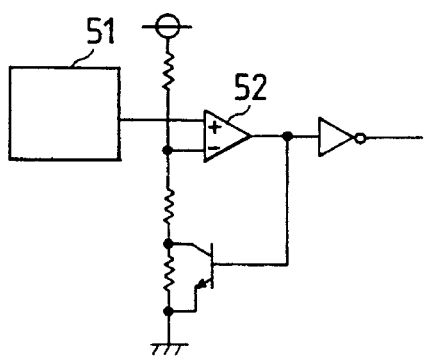
FIG. 9 is a circuit diagram which shows a second modification of a comparator.

FIG. 9 shows an alternative circuit structure which gives the hysteresis effect to a standard comparator 52. The use of either of the circuits shown in FIGS. 8 and 9 avoids a malfunction of the circuit caused by oscillation at the time a switch to the one-step mode occurs for stable operation of the pulse motor over a wide speed range.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications of the shown embodiments which can be embodied without departing from the principle of the invention as set forth in the appended clams. For example, the circuit of the second embodiment is, as discussed above, designed for reducing the quantity of heat produced by switching the drive current pulse from the three-step mode to the one-step mode using the frequency-voltage converter circuit 51, the comparator 52, and the logic circuit 52. These circuits may, however, be replaced by another circuit structure. For instance, the second embodiment can be realized only by using a drive current pulse mode-switching circuit and a three step mode-canceling circuit.

What is claimed is:

1. A driving apparatus for a pulse motor for use in a vehicle comprising:

a plurality of switching elements, having resistors, each disposed on an exciting line communicating in series with a corresponding one of a plurality of phase coils of the pulse motor;

switching control means for controlling switching operations of said switching elements, said switching control means being responsive to input of excitation signals provided based on a given input signal to the phase coils to energize said switching elements, in sequence, for establishing electrical communications to supply the excitation signals to the phase coils;

canceling signal output means for outputting a canceling signal to cancel a sequential communication operation of said switching control means when a voltage provided by said given input signal exceeds a preselected voltage level; and switching means, responsive to the canceling signal from said canceling signal output means, for canceling the sequential communication operation of said switching control means to input a given excitation signal to at least one of the phase coils of the pulse motor.

2. A driving apparatus for a pulse motor for use in a vehicle comprising:

a plurality of transistors connected in parallel with each other, said transistors having given resistances each leading to a corresponding one of a plurality of phase coils of the pulse motor;

a plurality of flip-flops connected in series with each other, said flip-flops communicating through a logic circuit with said transistors, respectively, for energize said transistors in sequence according to a variation in an input signal;

a frequency-voltage converter circuit provided prior to said flip-flops to convert the input signal into a voltage signal;

a comparator provided prior to said flip-flops to compare the voltage signal from said frequency-voltage converter circuit with a preselected threshold voltage to output a canceling signal to the logic circuit when the voltage signal exceeds the preselected threshold voltage for canceling sequential communication operations of said transistors while energizing at least one of said transistors to establish the electrical communication thereof.

3. A driving apparatus for a pulse motor comprising:

pulse source means for providing drive pulses, in sequence, to a plurality of phase coils of the pulse motor; and wave-shaping means for shaping the drive pulses provided from said pulse source means to the phase coils of the pulse motor, said wave-shaping means modifying leading and trailing edges of each of the drive pulses so as to vary at a given rate in plural steps, wherein said wave-shaping means includes a switching circuit for each phase coil, each of the switching circuits switching between first and second switching modes according to a given input signal, the first switching mode being established to vary the leading and trailing edges of each of the drive pulses in the plural steps when the given input signal is greater than a preselected value and it is required to rotate the pulse motor at a lower speed, the second switching mode being established to vary the leading and trailing edges of each of the drive pulses in one step when the given input signal is smaller than the preselected value and it is required to rotate the pulse motor at a higher speed.

4. A driving apparatus for a pulse motor comprising:

pulse source means for providing drive pulses, in sequence, to a plurality of phase coils of the pulse motor; and wave-shaping means for shaping the drive pulses provided from said pulse source means to the phase coils of the pulse motor, said wave-shaping means modifying leading and trailing edges of each of the drive pulses so as to vary at a given rate in plural steps, wherein said wave-shaping means selects between first and second wave-shaping modes, the first wave-shaping mode being to set first portions of the leading and trailing edges of each of the drive pulses to a first level, the second wave-shaping mode being to set second portions continuing from the first portions of the leading and trailing edges of each of the drive pulses to a second level higher than the first level.

* * * * *